US012756110B2

(12) United States Patent
Cosner et al.

(10) Patent No.: US 12,756,110 B2
(45) Date of Patent: Oct. 6, 2026

(54) SATELLITE ARRAY ARCHITECTURE

(71) Applicant: Blue Digs LLC, Wilmington, DE (US)

(72) Inventors: Chris Cosner, Los Angeles, CA (US); Ying Feria, Manhattan Beach, CA (US); Raenaurd Turpin, La Mirada, CA (US); Andre Houle, Rolling Hills Estates, CA (US); Richard Aston, Los Angeles, CA (US); Brett Cope, Los Angeles, CA (US); Ricardo Leon, Los Angeles, CA (US)

( * ) Notice: Subject to any disclaimer, the term of this patent is extended or adjusted under 35 U.S.C. 154(b) by 225 days.

(21) Appl. No.: 18/626,902

(22) Filed: Apr. 4, 2024

(65) Prior Publication Data

US 2024/0275071 A1 Aug. 15, 2024

Related U.S. Application Data

(63) Continuation of application No. 17/742,022, filed on May 11, 2022, now Pat. No. 11,955,715, which is a
(Continued)

(51) Int. Cl.
*H01Q 21/00* (2006.01)
*B64G 1/22* (2006.01)
(Continued)

(52) U.S. Cl.
CPC ....... *H01Q 21/0018* (2013.01); *B64G 1/2229* (2023.08); *B64G 1/641* (2013.01);
(Continued)

(58) Field of Classification Search
CPC ............ H01Q 1/288; H01Q 1/08; H01Q 3/46; H01Q 5/42; H01Q 5/50; H01Q 21/0018
See application file for complete search history.

(56) References Cited

U.S. PATENT DOCUMENTS

| | | | | |
|---|---|---|---|---|
| 5,052,640 | A * | 10/1991 | Chang | B64G 1/002 244/172.7 |
| 5,386,953 | A | 2/1995 | Stuart | |
| 5,959,592 | A | 9/1999 | Petruzzelli | |
| 6,388,615 | B1 | 5/2002 | Chang et al. | |
| 8,660,482 | B2 | 2/2014 | Burr | |
| 9,718,566 | B2 * | 8/2017 | Field | B64G 1/643 |

(Continued)

FOREIGN PATENT DOCUMENTS

| | | |
|---|---|---|
| CN | 103872463 A | 6/2014 |
| CN | 105151330 | 12/2015 |

(Continued)

*Primary Examiner* — Hoang V Nguyen

(57) ABSTRACT

A satellite system can include one or more satellites that orbit the Earth. The one or more satellites may have satellite buses that support antenna arrays. The antenna arrays may include space fed arrays. Each space fed array may have an antenna feed array and an inner array that is coupled to a direct radiating array. The direct radiating array may operate in the same satellite band as the space fed array, or upconversion and downconversion circuitry may be used to communicatively couple a direct radiating array that operates in a different satellite band to the space fed array. The satellites may have peripheral walls with corner fittings that can be selected to provide the satellite bus with particular leg strengths. This can reduce overall mass of the satellites in a payload fairing while accommodating different types of antenna arrays.

20 Claims, 9 Drawing Sheets

Related U.S. Application Data continuation of application No. 16/900,716, filed on Jun. 12, 2020, now Pat. No. 11,336,029, which is a continuation of application No. 16/240,569, filed on Jan. 4, 2019, now Pat. No. 10,686,256, which is a continuation of application No. 15/672,122, filed on Aug. 8, 2017, now Pat. No. 10,177,460.

(60) Provisional application No. 62/489,369, filed on Apr. 24, 2017.

(51) Int. Cl.

| | |
|---|---|
| ***B64G 1/64*** | (2006.01) |
| ***H01Q 1/08*** | (2006.01) |
| ***H01Q 1/28*** | (2006.01) |
| ***H01Q 5/42*** | (2015.01) |
| ***H01Q 5/50*** | (2015.01) |
| *H04B 7/185* | (2006.01) |

(52) U.S. Cl.

CPC ............ *B64G 1/643* (2023.08); *H01Q 1/288* (2013.01); *H01Q 5/42* (2015.01); *H01Q 5/50* (2015.01); *H04B 7/18513* (2013.01); *B64G 1/2222* (2023.08); *H01Q 1/08* (2013.01); *H04B 7/18515* (2013.01)

(56) References Cited

U.S. PATENT DOCUMENTS

| | | | |
|---|---|---|---|
| 2002/0149540 | A1 | 10/2002 | Munder et al. |
| 2003/0043068 | A1 | 3/2003 | Gayrard et al. |
| 2003/0206134 | A1 | 11/2003 | Lier et al. |
| 2007/0046547 | A1 | 3/2007 | Crouch |
| 2007/0200780 | A1 | 8/2007 | Hentosh et al. |
| 2008/0143636 | A1 | 6/2008 | Couchman et al. |
| 2009/0009391 | A1 | 1/2009 | Fox et al. |
| 2011/0076956 | A1 | 3/2011 | Tronc et al. |
| 2014/0119385 | A1 | 5/2014 | Hoffmeyer et al. |
| 2016/0248157 | A1 | 8/2016 | Rao et al. |
| 2016/0268676 | A1 | 9/2016 | Chang et al. |
| 2016/0304219 | A1 | 10/2016 | Tadros et al. |
| 2017/0033462 | A1 | 2/2017 | Clemente et al. |
| 2018/0041270 | A1 | 2/2018 | Buer et al. |
| 2019/0109635 | A1 | 4/2019 | Buer et al. |

FOREIGN PATENT DOCUMENTS

| | | | |
|---|---|---|---|
| CN | 105337046 | A | 2/2016 |
| EP | 0421722 | A2 | 4/1991 |
| WO | 2003015212 | A1 | 2/2003 |
| WO | 2006130993 | A1 | 12/2006 |
| WO | 2016146195 | A1 | 9/2016 |
| WO | 2016174625 | A1 | 11/2016 |

* cited by examiner

SATELLITE ARRAY ARCHITECTURE

This application is a continuation of U.S. patent application Ser. No. 17/742,022, filed May 11, 2022, which is a continuation of U.S. patent application Ser. No. 16/900,716, filed Jun. 12, 2020, which is a continuation of U.S. patent application Ser. No. 16/240,569, filed Jan. 4, 2019, which is a continuation of U.S. patent application Ser. No. 15/672,122, filed Aug. 8, 2017, which claims the benefit of provisional patent application No. 62/489,369, filed on Apr. 24, 2017, each of which is hereby incorporated by reference herein in its entirety.

FIELD

Non This disclosure relates generally to communications, including to satellite systems and architectures for use in a communications network.

BACKGROUND

Communications systems often use satellites to convey data. Satellite-based systems allow information to be conveyed wirelessly over large distances, such as oceans. For example, satellite-based systems can be used to convey information to land-based devices such as handheld equipment and home or office equipment. Further, satellite communications systems can be used to provide coverage where physical infrastructure has not been installed and/or to mobile devices that do not remain attached to an infrastructure resource.

It can be challenging to implement an effective satellite-based communications system. If care is not taken, satellites may be deployed inefficiently, leading to elevated costs and suboptimal ground coverage. Further, if a satellite-based communications system is designed to serve a period or region of highest demand, resources may remain idle during periods of lower demand and/or over regions with lower demand. Moreover, a conventional satellite-based communication system designed for a particular demand level may not be able to dynamically increase capacity in response to higher demand.

SUMMARY

A satellite system (or constellation) may have satellites that orbit the Earth and that communicate with ground-based equipment, such as mobile devices and/or equipment situated in a home or office. A satellite may include a satellite bus that supports, among other things, one or more antenna arrays. The one or more antenna arrays may include one or more space fed arrays. A space fed array may have an antenna feed array and an inner array.

The inner array of a space fed array may be coupled (directly or indirectly) to a direct radiating array. The direct radiating array may operate in the same satellite band as the space fed array or may operate in a different satellite (or other) band. In configurations in which a satellite is provided with a direct radiating array that operates in a different band than the space fed array, upconversion and downconversion circuitry may be coupled between the direct radiating array and the space fed array.

Beam forming and/or signal routing circuitry may be coupled (directly or indirectly) to the feed array in the space fed array. The beam forming and/or signal routing circuitry and the antenna feed array may be housed within a satellite bus having peripheral walls attached to corner fittings. The corner fittings can be customized to provide the satellite bus with customized leg lengths, shapes, and strengths. This may help in forming nested stacks of satellites in a payload fairing and in accommodating stacked satellites with different types of antenna arrays.

DETAILED DESCRIPTION

The present disclosure, including the accompanying drawings, is illustrated by way of examples and not by way of limitation.

Figure 1:
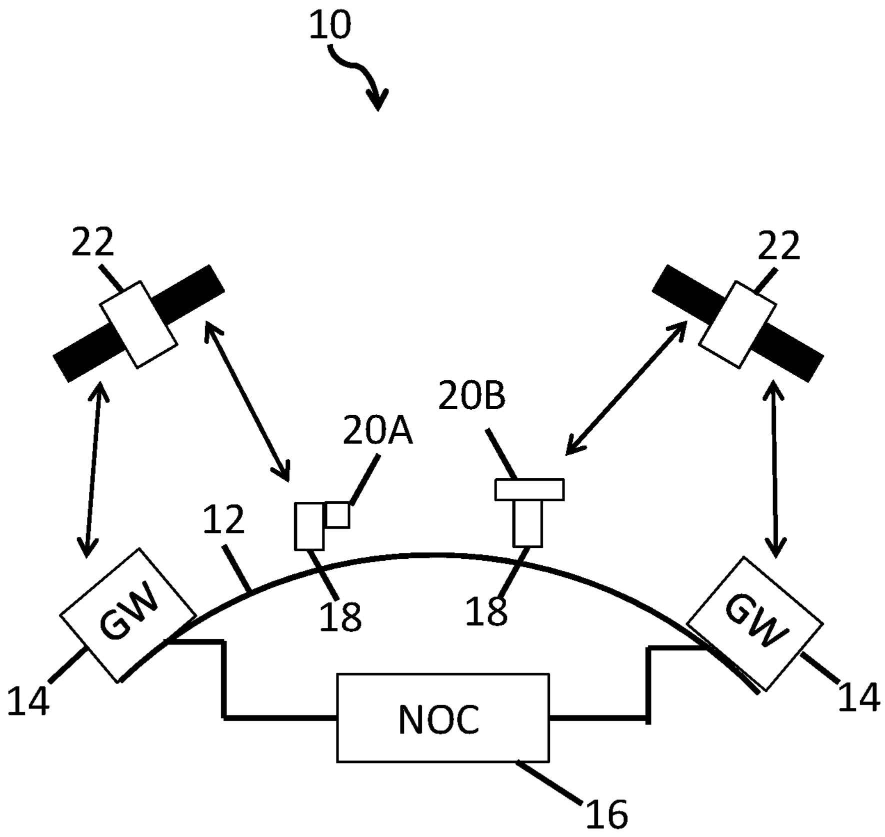
FIG. 1 presents a diagram of an example communications system with satellites, in accordance with some embodiments.

A communications network may include one or more communications satellites and other equipment, including ground-based communications equipment and user terminals (or user equipment (UE)). One or more of the satellites may be used to deliver wireless services, e.g., to portable electronic devices, home and/or office equipment, and other equipment. For example, wireless services can be provided to handheld devices, wearable devices, set-top boxes, media devices, mobile terminals, computing devices, sensors, etc. An illustrative communications system with satellites is shown in FIG. 1. As shown in FIG. 1, system 10 may include one or more constellations of communications satellites 22. Satellites 22 may be placed in any/all of low earth orbit (LEO) (e.g., at altitudes of 500-1500 km or other suitable altitudes), geosynchronous orbit, and/or medium earth orbit (MEO) around the Earth 12. Satellites 22 may form a satellite constellation having one or more sets of satellites with different types of orbits, e.g., that are synchronized with each other to provide user populations (or geographic regions) with desired amounts of coverage. There may be any suitable number of satellites 22 in the satellite constellation(s) of system 10 (e.g., 10-100, 1,000-10,000, more than 100, more than 1000, fewer than 10,000, etc.).

Satellites 22 may deliver wireless services to equipment, such as electronic devices 18. Electronic devices 18 may include handheld devices and/or other mobile devices such as cellular telephones, tablet computers, laptop computers, wristwatches and other wearable devices, mobile terminals, drones, robots, and other portable electronic devices. Electronic devices 18 may include one or more relatively small antennas (see, e.g., antenna 20A, which may be included in an electronic device 18 or may be coupled (directly or indirectly) to an electronic device 18). Further, electronic devices 18 and may include less portable equipment, such as a set-top box, router, home base station or other such device, and may have one or more larger antennas (see, e.g., antenna 20B, which may be included in or otherwise associated with electronic equipment, e.g., in a home or office). Electronic devices 18 may be located anywhere on or above the Earth, e.g., on land, at sea, or in the air. The services provided by satellites 22 may include telephone (voice) service, broadband internet access, media distribution services such as satellite audio (satellite radio and/or streaming audio services) and satellite television (video), data communications, location, and/or other services.

System 10 may include one or more network operations centers (NOCs) such as NOC 16, which can be coupled to one or more gateways, e.g., gateways 14. There may be any suitable number of gateways 14 in system 10 (e.g., 1-100, more than 10, more than 100, fewer than 1000, etc.). Gateways 14 may have transceivers that allow the gateways to transmit wireless signals to satellites 22 over wireless links 20 and that allow the gateways to receive wireless signals from satellites 22 over wireless links 20. Wireless links 20 may also be used to support communications between satellites 22 and electronic devices 18. During media distribution operations, for example, a gateway 14 may send traffic over an uplink (one of links 20) to a given satellite 22 that is then routed via a downlink (one of links 20) to one or more electronic devices 18. Gateways 14 may perform a variety of services, including supplying media for electronic devices 18, routing telephone calls (e.g., voice and/or video calls) between electronic devices 18 and/or other equipment, providing electronic devices 18 with internet access, and/or delivering other communications and/or data services to electronic devices 18. Gateways 14 may communicate with each other via satellites 22 and/or using ground-based communications networks.

NOC 16 may be used to manage the operations of one or more gateways 14 and/or the operations of one or more satellites 22. For example, NOC 16 may monitor network performance and take appropriate corrective actions if warranted. During these operations, NOC 16 may update software for one or more satellites 22 and/or electronic devices 18, may adjust satellite 22 altitude and/or other orbital parameters, may direct one or more satellites 22 to perform operations to adjust satellite solar panels and/or other satellite components, and/or may otherwise control and maintain one or more of the satellites 22 in the constellation of satellites orbiting the Earth 12. Further, in some embodiments, NOC 16 also may be configured to perform maintenance operations on one or more gateways 14.

Gateways 14, satellites 22, NOC 16, and electronic devices 18 may be configured to support encrypted communications. For example, NOC 16 and gateways 14 may communicate using encrypted communications. Similarly, gateways 14, satellites 22, and electronic devices 18 may communicate using encrypted communications. This allows NOC 16 to issue secure commands and to receive secure information when communicating with gateways 14, satellites 22, and/or electronic devices 18. The use of encrypted communications within system 10 also allows electronic devices 18 to securely communicate with each other and with gateways 14, and also allows gateways 14 to securely distribute media and/or other information to electronic devices 18, e.g., in compliance with digital protection requirements.

During operation of system 10, satellites 22 may serve as orbiting relay stations. For example, when a gateway 14 transmits a wireless uplink signal, one or more satellites 22 may forward these signals as downlink signals to one or more electronic devices 18. In some embodiments, some electronic devices 18 may be receive-only devices while other electronic devices 18 may support bidirectional communications with satellites. In scenarios in which an electronic device 18 supports bidirectional communications, an electronic device 18 may transmit wireless signals to one or more satellites 22, so that the one or more satellites 22 may relay this information to one or more appropriate destinations (e.g., gateways 14, other electronic devices 18, etc.).

Satellites 22 may support any suitable satellite communications bands (e.g, IEEE bands) such as the L-band (1-2 GHz), S-band (2-4 GHz), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies). Illustrative configurations in which satellites 22 support C and/or V bands may sometimes be described herein as an example, but other bands can be used as desired.

Some frequencies (e.g., C-band frequencies and other low frequencies such as L-band and S-band frequencies) may penetrate buildings and may therefore be suitable for communicating with electronic devices located indoors at least some of the time, e.g., handheld electronic devices 18 (e.g., devices that are mobile and that may sometimes be indoors and may sometimes be outdoors) and/or electronic devices 18 without an external antenna/receiver. Other frequencies (e.g., V-band frequencies and other high frequencies such as Ka-band and W-band frequencies) do not readily (or effectively) penetrate buildings and may therefore be suitable for communicating with electronic devices 18 that have external antennas/receivers (e.g., antenna 20B) that are mounted outdoors and/or otherwise have a line-of-sight path to satellites 22. To accommodate a variety of scenarios, e.g., both mobile device scenarios and home/office scenarios, satellites 22 may, for example, include C-band satellites (or other low band satellites such as L-band or S-band satellites), V-band satellites (or other high band satellites such as Ka-band or W-band satellites) and/or dual-band satellites (e.g., satellites that that support C-band and V-band communications or other low and high band communications).

Satellites 22 may use any suitable types of antennas (e.g., phased antenna arrays, fixed direct radiating arrays, deployable direct radiating antenna arrays, space fed arrays, reflector fed arrays, etc.). Antenna arrays based on space fed arrays that can be collapsed into a flat stowed profile when being delivered to space may sometimes be described herein as an example.

In at least some embodiments, a collapsible space fed array (sometimes referred to as a space fed lens array) is used to feed a direct radiating array. The direct radiating array may operate in the same satellite band as the space fed array (e.g., at V-band frequencies) or may operate at a different satellite band (e.g., C-band frequencies). In configurations in which the direct radiating array operates at C-band frequencies, upconversion and downconversion circuitry may be used to convert between the frequency of operation of the space fed array (V-band in this example) and the frequency of operation of the direct radiating array (C-band in this example). By converting C-band signals to V-band for the space fed array, the size of the space fed array may be reduced (because a V-band space fed array may occupy less space than a C-band space fed array).

Figure 2:
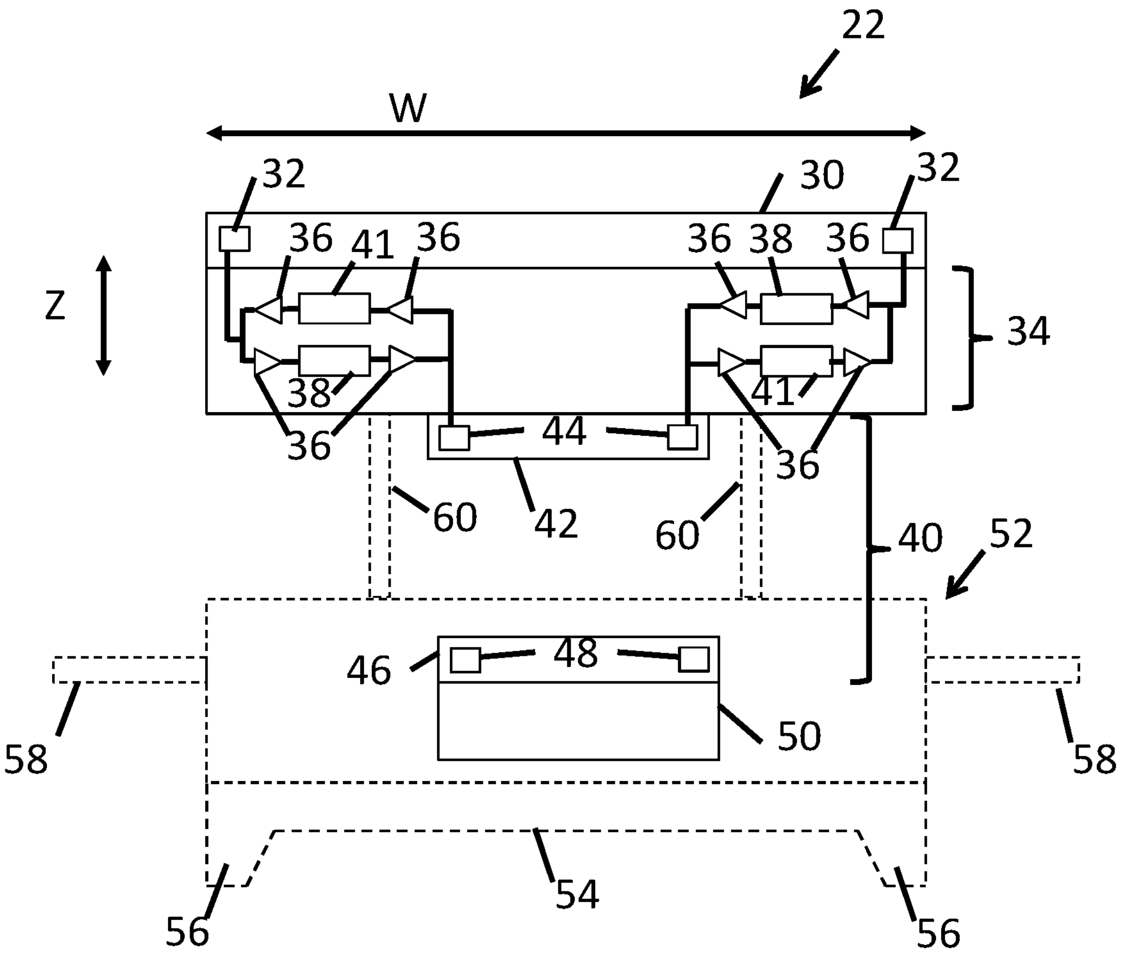
FIG. 2 presents a side view of an illustrative satellite having a direct radiating array and an inner array that have different sizes and that may operate using different bands, in accordance with some embodiments.

FIG. 2 presents a side view of an illustrative satellite with a collapsible (e.g., foldable) space fed array. As shown in FIG. 2, satellite 22 may have a housing structure such as bus 52. Bus 52 may have a main portion 54, which can include fixed or detachable downwardly extending legs 56. The shape of bus 52 may be relatively flat (e.g., planar and relatively thin when viewed from the side) with a polygonal outline or other suitable outline (e.g., a hexagonal or octagonal footprint when viewed from above). The flat shape of bus 52 may facilitate stacking. Solar panels 58 may extend from the sides of bus 52 and may be used to power bus 52. Bus 52 may be provided with any/all of a chemical propulsion system, an electrical propulsion system (e.g., a set of 4-8 thrusters each with an associated tank of an ionized fluid), a hybrid propulsion system, and/or other suitable propulsion system(s).

Direct radiating antenna array (direct radiating array) 30 may have an array of antenna elements 32 (e.g., 10s of elements, 100s of elements, or other suitable number of elements). Circuitry 34 may be used to couple (communicatively) array 30 to inner array 42. Inner array 42 may have an array of antenna elements 44 (e.g., 10s of elements, 100s of elements, or other suitable number of elements). Each of elements 44 may be coupled (communicatively) to a respective one of elements 32 using circuitry 34.

Circuitry 34 may include any/all of integrated circuits, discrete components, transmission line structures, and/or other circuitry on one or more substrates, such as one or more printed circuit boards. A heat sink structure may be used to radiate excess heat. The circuit components of circuitry 34 may include amplifiers, such as amplifiers 36, upconversion circuitry such as upconverters 38 (e.g., C-band to V-band upconverters), and downconversion circuitry such as downconverters 41 (e.g., V-band to C-band downconverters). Each downconverter 41 may be embedded in a chain of amplifiers (e.g., power amplifiers) that provides signals from a given one of elements 44 in inner array 42 to a corresponding element 32 in direct radiating array 30. The signals provided by downconverters 41 are downconverted versions of the signals received by inner array 42. Each upconverter 38 may be embedded in a chain of amplifiers 36 (e.g., low noise amplifiers) that provides signals from a given one of elements 32 in direct radiating array 30 to a corresponding element 44 in inner array 42. The signals provided by upconverters 38 are upconverted versions of the signals received by array 30.

Space fed array 40 may include inner array 42 and feed array 46. Feed array 46 may include an array of antenna elements 48 (e.g., 10s of elements, 100s of elements, or other suitable number of elements). Feed array 46 may be coupled to phased antenna array feed circuitry such as beamforming and signal routing circuitry 50. Circuitry 50 may be used to feed one or more antenna elements 48 in feed array 46. During operation, digital and analog beamforming operations may be performed by circuitry 50. Space fed array 40 and direct radiating array 30 serve as a radio-frequency lens that projects outgoing wireless signals from feed array 46 onto a desired location on the Earth and that routes incoming signals from Earth onto appropriate antenna elements 48 of feed array 46. The signal routing circuitry in circuitry 50 may include, for example, a 1000×1000 switch or other suitable switching circuitry for routing uplinks to downlinks Band management (channelizer) functions may be supported using circuitry 50. Circuitry 50 and the antenna arrays of satellite 22 may be used to handle up to thousands or tens of thousands of individual wireless satellite signal beams (e.g., beams associated with individual electronic devices 18 and/or groups of electronic devices 18, gateways 14, etc.).

Deployment actuators 60 may form support posts and may include electrically controlled actuators, power transfer cables, shielding, and other structures. When extended as shown in FIG. 2, deployment structures 60 separate inner array 42 from feed array 46. The separation between inner array 42 and feed array 46 may be, for example, approximately 2 meters. However, an appropriate (effective) separation distance can be selected based on the inner array 42 and feed array 46 configuration. When transporting satellite 22 to orbit, structures 60 may be retracted (e.g., in the −Z direction) into bus 52 to stow antenna arrays 30 and 42 in a compact arrangement.

The size of satellite 22 and/or its associated antenna space fed arrays may be reduced by converting signals between bands using circuitry 34. The width (diameter) W of a C-band array (direct radiating array 30) may be fairly large (e.g., 8-11 meters, more than 6 m, more than 8 m, less than 10 m, less than 15 m, etc.). To feed direct radiating array 30 with a space fed array operating at C-band frequencies, the widths (diameters) of feed array 46 and inner array 42 would need to be enlarged accordingly. With the upconversion/downconversion arrangement of FIG. 2, however, space-fed array 40 may operate at V-band frequencies and can be relatively compact (e.g., 1-5 m in diameter, less than 5 m in diameter, less than 3 m in diameter, more than 0.5 m in diameter, etc.). Configurations in which direct radiating array 30 of satellite 22 supports only V-band operations may also be used.

Figure 3:
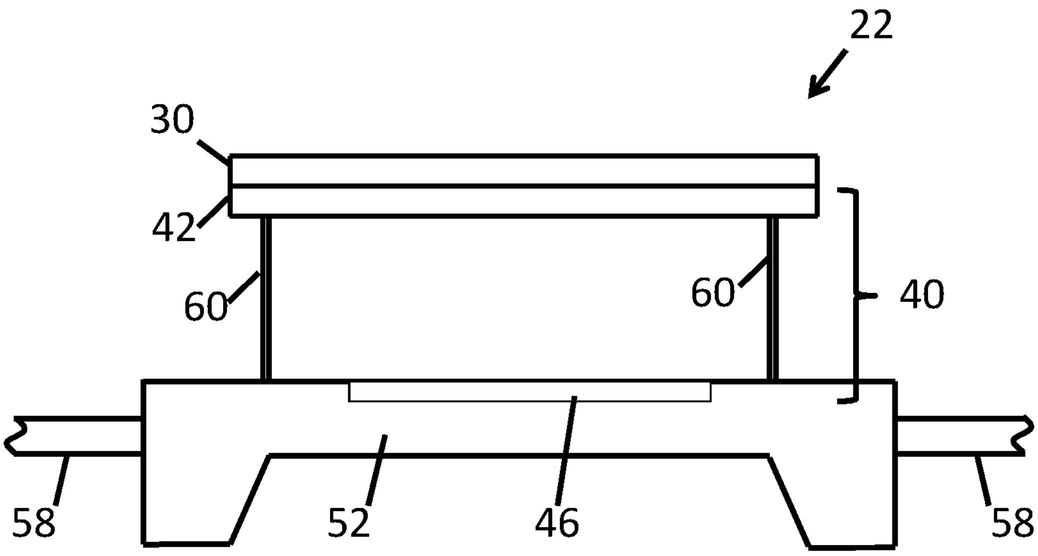
FIG. 3 presents a side view of an illustrative satellite having a direct radiating array and an inner array that may handle satellite signals in a common satellite band, in accordance with some embodiments.

As shown in FIG. 3, for example, direct radiating array 30 may be implemented as a V-band array with a relatively compact width (diameter) W (e.g., a width that is comparable to the width of inner array 42 of V-band space-fed array 40. In this type of arrangement, upconverters 38 and downconverters 41 may be omitted. If desired, some of satellites 22 in system 10 (FIG. 1) may be C/V-band satellites of the type shown in FIG. 2 and other satellites 22 in system 10 may be V-band satellites, e.g., as shown in FIG. 3. The same type of space fed array (see, e.g., array 40 of FIGS. 2 and 3) may be used in both types of satellite, thereby reducing system complexity.

The antenna elements that form the antenna arrays of satellites 22 may be any/all of horn antennas, slot antennas, patch antennas, monopoles, dipoles, antennas that use other types of antenna resonating elements and/or that use combinations of these antenna elements. In arrangements where a relatively large array is involved, it may be desirable to form an array from a set of interlocking antenna array panels (tiles). Satellites such as satellite 22 of FIG. 3 that operate only in higher bands (e.g., the V-band in this example) may use antenna structures (e.g., arrays 30) with smaller widths W than satellites such as satellites 22 of FIG. 2 that has a direct radiating array 30 that operates at C-band frequencies. Accordingly, direct radiating array 30 of satellite 22 of FIG. 3 may have an antenna array panel stack formed from a single panel or relatively small number of panels, and this stack will be shorter than an antenna array panel stack formed from the larger number of panels for a corresponding direct radiating array 30 of satellite 22 of FIG. 2.

Satellites 22 may be stacked vertically when loaded into a payload fairing of a launch vehicle. To accommodate antenna array panel stacks of different heights in a nested stack that includes satellites 22 with different types of antenna arrays, satellites 22 may have individualized buses. Each bus 52 may be individualized depending on its location in the stack of buses in the fairing and/or based on the payload type of the bus underneath that bus.

Figure 4:
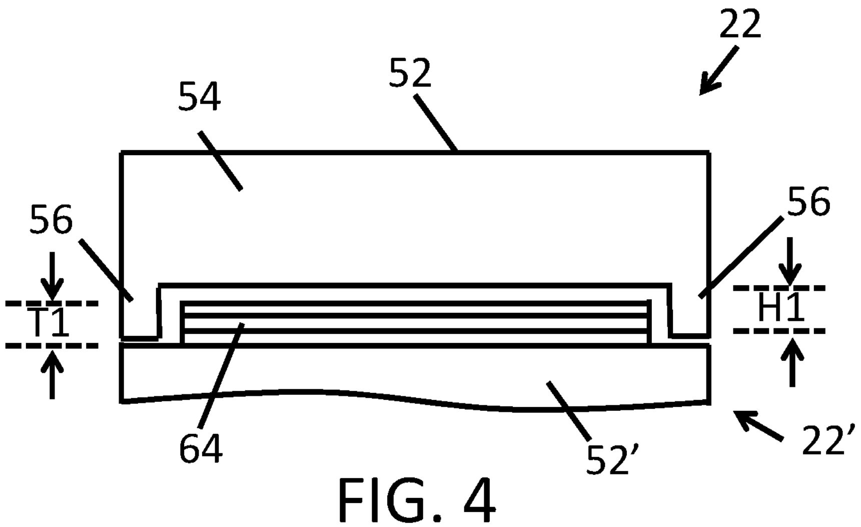
FIG. 4 presents a side view of an illustrative satellite bus having short legs to accommodate a short payload on an underlying satellite bus, in accordance with some embodiments.

Consider, as an example, the arrangement of FIG. 4. In the FIG. 4 example, satellite 22 has bus 52 with main portion 54 and legs 56. Underlying satellite 22' has a bus 52' with a relatively short antenna array panel stack 64. Short panel stack 64 may have a height T1 and may, for example, be associated with a satellite of the type shown in FIG. 3 (e.g., a V-band satellite). To accommodate height T1, which is relatively short, bus 52 of satellite 22 may have short legs 56 of height H1. In some embodiments, bus 52 may also include an array of stowed solar panels, which also can be factored when determining the length of legs 56 and the separation height H1.

Figure 5:
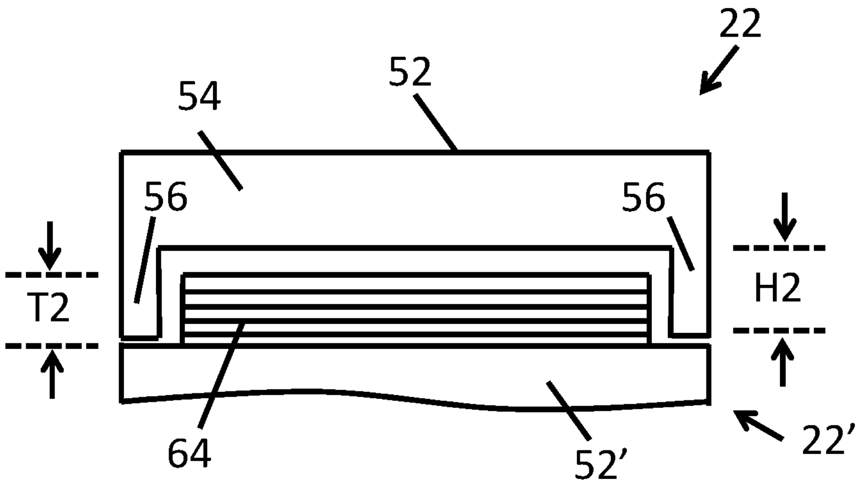
FIG. 5 presents a side view of an illustrative satellite bus having tall legs to accommodate a tall payload on an underlying satellite bus, in accordance with some embodiments.

As another example, consider the arrangement of FIG. 5. In the FIG. 5 example, satellite 22 has a bus such as bus 52 with relatively tall legs 56 of height H2, so that there is sufficient space under satellite 22 to accommodate a tall antenna array panel stack 64 on satellite bus 52' of satellite 22'. Tall stack 64 of FIG. 5 has a height T2 that is larger than T1 (e.g., stack 64 of FIG. 5 may contain more antenna array panels for supporting C-band operations). Because height T2 is less than H2, stack 64 can be accommodated in the space under satellite 22.

Figure 6:
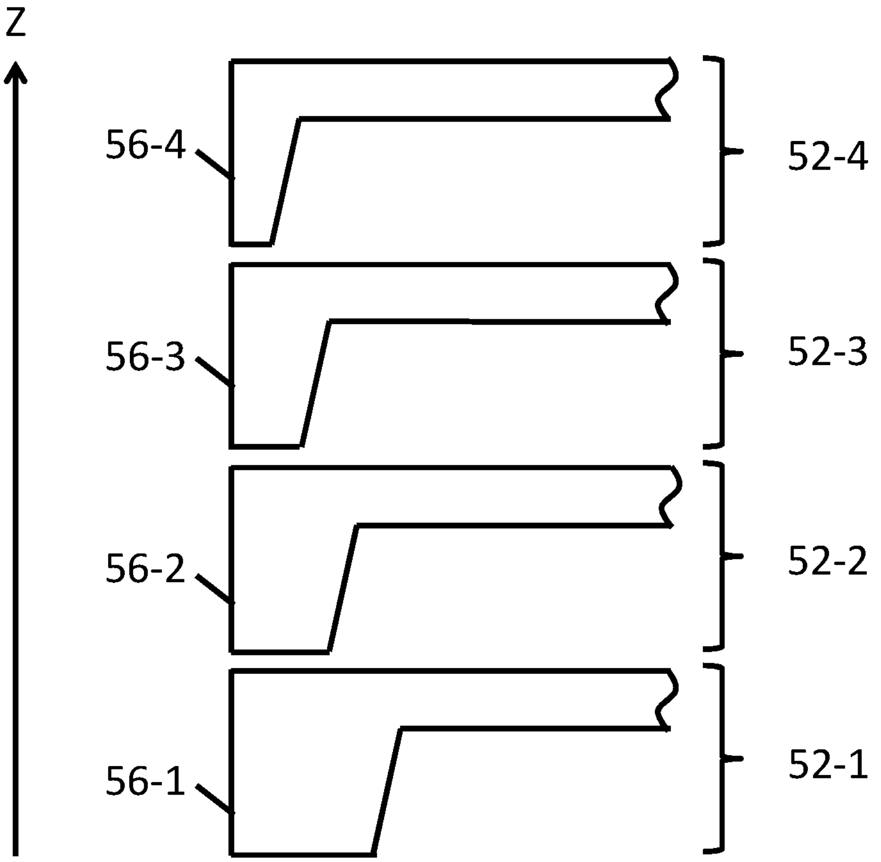
FIG. 6 presents a side view of a portion of a stack of satellite buses having support structures, such as legs that vary in shape, size, and/or strength as a function of position within the stack, in accordance with some embodiments.

Legs 56 on each bus 52 may, if desired, be customized based on the position of that bus 52 within a stack of nested buses 52 in a payload fairing (e.g., based on vertical location Z of FIG. 6). As shown in FIG. 6, for example, legs 56 may have different shapes, different sizes, and/or different strengths, depending on the vertical location Z. The different configurations for legs 56 may be selected so that legs 56 are stronger (e.g., bigger or made from a stronger material) at lower positions (smaller Z values) and are progressively weaker (e.g., smaller or made from a lighter material) at higher positions (larger Z values). This helps ensure that the satellites at the lower portions of a satellite stack will not be damaged due to excessive weight from satellites stacked above. Satellites at the top of the stack can be formed with lighter and smaller legs than the lower-level satellites because fewer satellites are stacked above, thereby saving overall payload weight. The composition of the legs 56 for each bus in a stack can be selected based on the load the legs 56 will need to sustain during launch. For example, during launch, the load experienced by a bus at or near the bottom of the stack (e.g., bus 52-1) will be greater than the load experienced by a bus at or near the top of the stack (e.g., bus 52-4). Since the load during launch is greater than that experienced prior to launch, each leg 56 can be selected in accordance with the load (e.g., the maximum load) it will experience during launch. Legs 56 can vary in size, shape, thickness, density, composition, height, etc. to provide for stronger legs 56 on buses 52 near the bottom of the stack and lighter (and possibly less expensive) legs 56 on buses near the top of the stack. Further, the height of legs 56 also can be selected based on the necessary separation from the bus immediately below, e.g., based on stowed antenna and/or solar arrays. In at least some embodiments, a limited number of legs 56 will be available as options to accommodate different height and strength needs, while still satisfying economies of scale (e.g., not every leg 56 needs to be customized).

Figure 7:
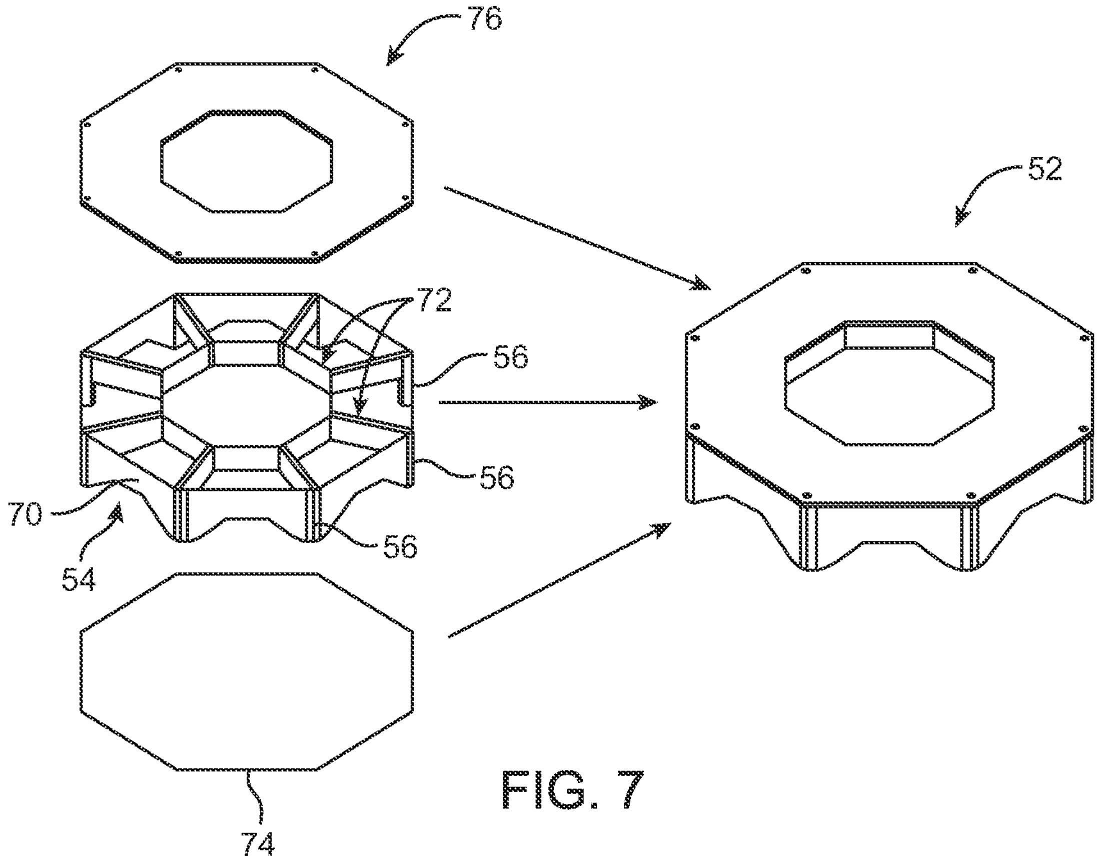
FIG. 7 presents a diagram showing structures that may be used in forming a satellite bus, in accordance with some embodiments.

FIG. 7 shows how main bus portion 54 may be formed from peripheral wall panels 70 supported by a network of internal panels 72. Ring-shaped planar upper panel 76 may be attached to the top of panels 70 and 72 and planar lower panel 74 may be attached to the bottom of panels 70 and 72 to form bus 52. Legs 56 may be formed from variable-length corner fittings attached to perimeter panels 70 (e.g., corner fittings that are attached to panels 70 using welds, screws or other fasteners, adhesive, or other attachment mechanisms). The structures of FIG. 7 may be formed from any/all of metal, polymer (e.g., fiber-composite materials), and/or other suitable materials. In the example of FIG. 7, bus 52 has an octagonal outline (i.e., an octagonal footprint when viewed from above). If desired, bus 52 may be configured to have a hexagonal outline, other polygonal outlines, or other shapes. The example of FIG. 7 is merely illustrative.

Figure 8:
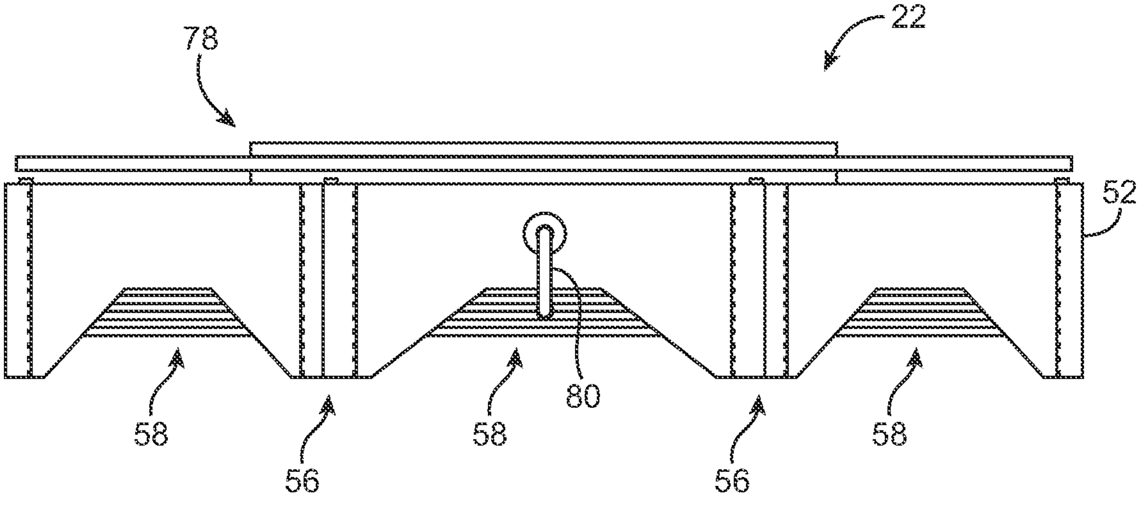
FIG. 8 presents a side view of an illustrative satellite with an antenna array in a stowed configuration, in accordance with some embodiments.

As shown in the side view of FIG. 8, one or more panels, such as solar panels 58, may be stacked under bus 52 prior to deployment in space. Antenna arrays 78 (e.g., panels for direct radiating array 30) may be stored on top of bus 52 (e.g., by retracting deployment actuators 60). Deployment arm 80 may be used to move solar panels 58 from the stowed configuration of FIG. 8 to a deployed configuration in which solar panels 58 extend from the sides of bus 52 (see, e.g., FIGS. 2 and 3). Springs, hinges, stop structures, and other mechanisms may be used to help deploy panels 58 in desired shapes (e.g., in two long arms extending from opposing sides of bus 52 or other suitable solar panel array shapes). Panels 58 may be polygonal (hexagonal, octagonal, rectangular, etc.) or may have other suitable shapes.

Figure 9:
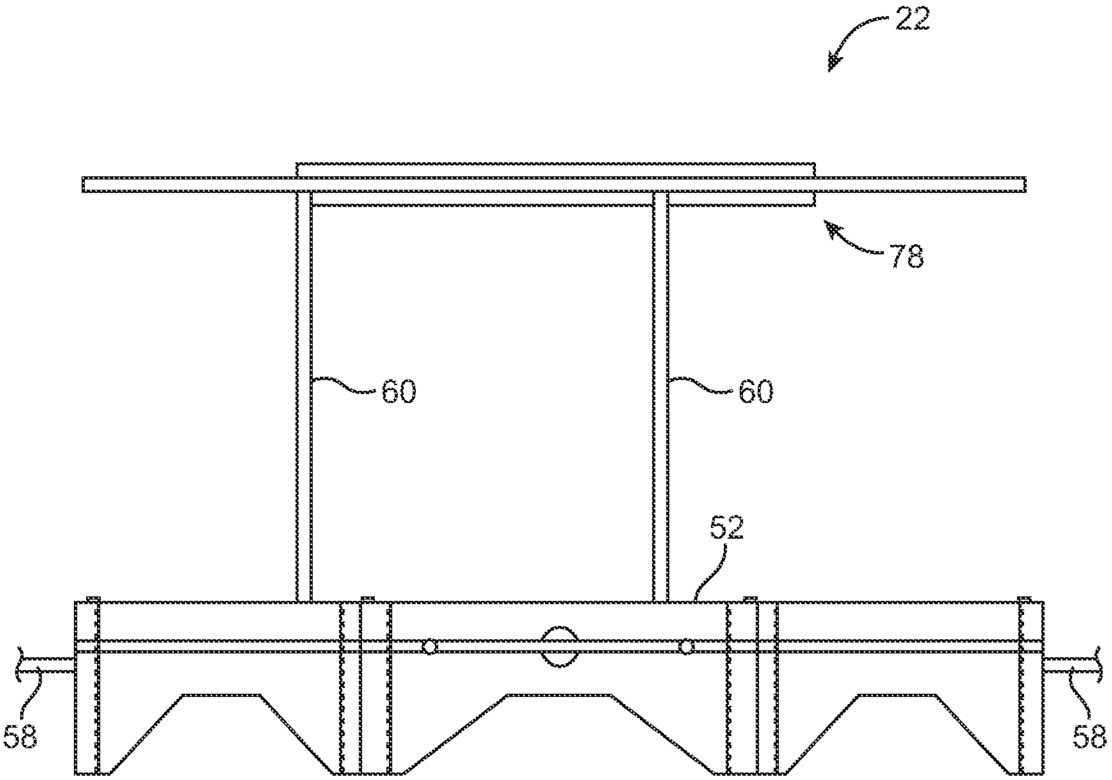
FIG. 9 presents a side view of the illustrative satellite of FIG. 8 with the antenna array in a deployed configuration, in accordance with some embodiments.

In the example of FIG. 8, antenna arrays 78 are in a stowed configuration. FIG. 9 shows how antenna arrays 78 of FIG. 8 in a deployed configuration. For example, deployment actuators 60 can be extended to move the antenna arrays 78 (along with any other associated hardware) away from bus 52.

Figure 10:
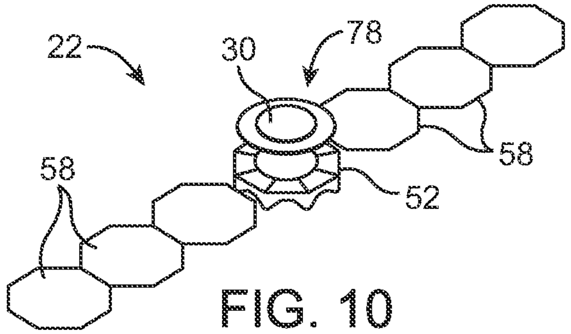
FIG. 10 presents a perspective view of an illustrative satellite with a direct radiating array and an inner array of comparable sizes, in accordance with some embodiments.
Figure 11:
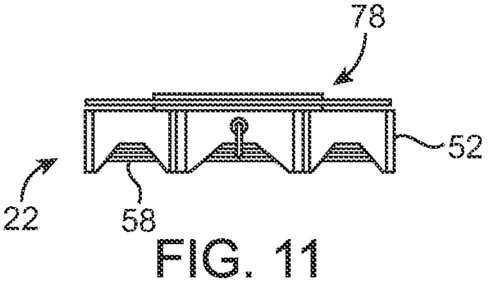
FIG. 11 presents a side view of the illustrative satellite of FIG. 10 with its antenna arrays in a stowed configuration, in accordance with some embodiments.
Figure 12:
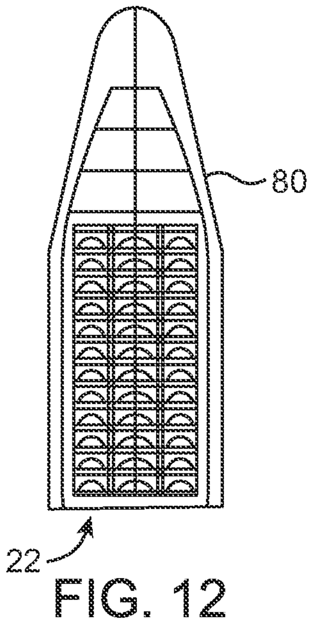
FIG. 12 presents a cross-sectional side view of an illustrative spacecraft payload fairing loaded with satellites of the type shown in FIGS. 10 and 11, in accordance with some embodiments.

FIG. 10 is a perspective view of satellite 22 in a configuration in which antenna arrays 78 include a small direct radiating array 30 (e.g., a V-band array). FIG. 11 presents a side view of satellite 22 of FIG. 10, in which solar panels 58 and antenna arrays 78 have been stowed, e.g., prior to stacking satellite 22 with other satellites in payload fairing 80 (FIG. 12). Satellites 22 may be nested on top of one another using legs 56 (and possibly other structures) to achieve separation. One or more characteristics of the legs 56 (e.g., height, strength, shape, size, composition, etc.) can be selected with reference to the position of satellite 52 within the nested stack. Each satellite 22 may, if desired, have individually selected legs that have a height chosen to accommodate the thickness of the payload of the satellite bus directly under that satellite and/or a strength (or load-bearing capability) to accommodate the load the bus 52 will experience, depending on its relative stack position, during launch.

Figure 13:
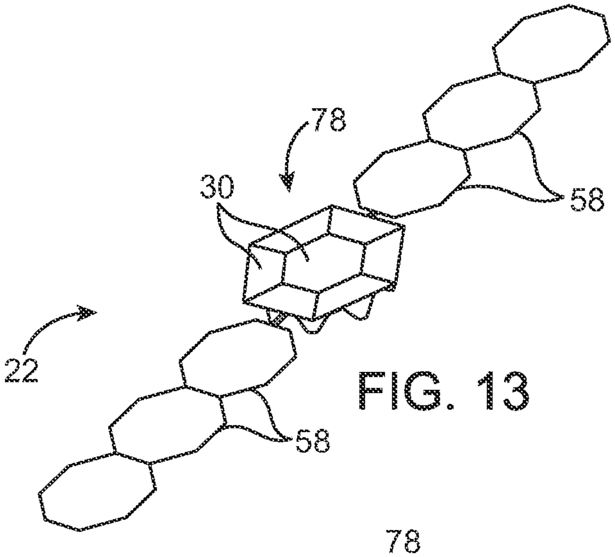
FIG. 13 presents a perspective view of an illustrative satellite with a direct radiating array that is larger than an inner array, in accordance with some embodiments.
Figure 14:
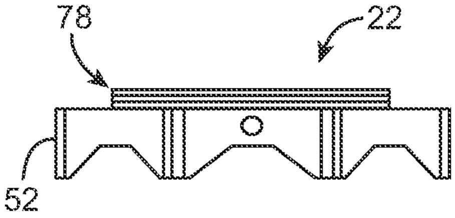
FIG. 14 presents a side view of the satellite of FIG. 13 with its antenna arrays in a stowed configuration, in accordance with some embodiments.
Figure 15:
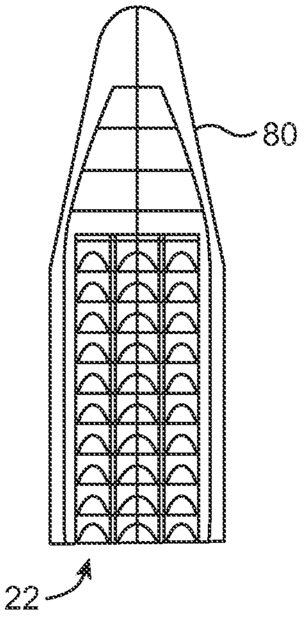
FIG. 15 presents a cross-sectional side view of a spacecraft payload fairing loaded with satellites of the type shown in FIGS. 13 and 14, in accordance with some embodiments.

FIG. 13 presents a perspective view of satellite 22 in a configuration in which antenna arrays 78 have tiled array panels, such as a central hexagonal panel surrounded by six trapezoidal panels to form a polygonal antenna array shape (e.g., for a direct radiating array 30 that supports C-band frequencies, such as direct radiating array 30 of FIG. 2). FIG. 14 shows how the stack of panels of antenna arrays 78 of FIG. 13 may be thicker (e.g., when nested) than the panel(s) of antenna arrays 78 of satellite 22 of FIG. 11. Accordingly, a satellite bus 52 above the stack of panels of antenna arrays 78 of FIG. 13 would need to be fitted with longer legs 56 to accommodate the added height. FIG. 15 shows how satellites such as satellite 22 of FIG. 14 may be loaded into payload fairing 80 in nested stacks.

Figure 16:
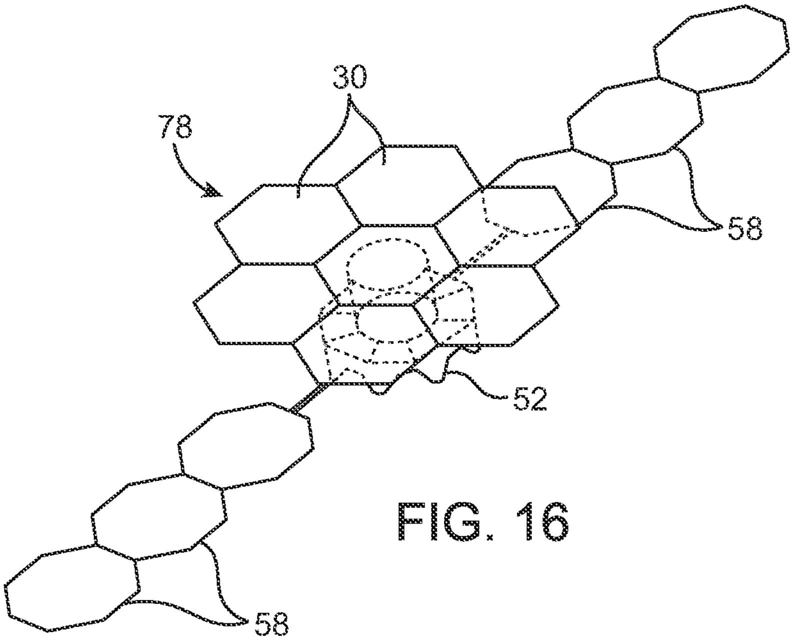
FIG. 16 presents a perspective view of an illustrative satellite with a tiled direct radiating array that is larger than an inner array, in accordance with some embodiments.

FIG. 16 is a perspective view of satellite 22 in a configuration in which antenna arrays 78 have tiled hexagonal antenna array panels that form a relatively large antenna array structure (e.g., for a direct radiating array 30 that supports C-band frequencies such as direct radiating array 30 of FIG. 2). If desired, the panels of array 30 may be formed from octagonal panels or panels of other shapes. The example of FIG. 16 is merely illustrative.

Figure 17:
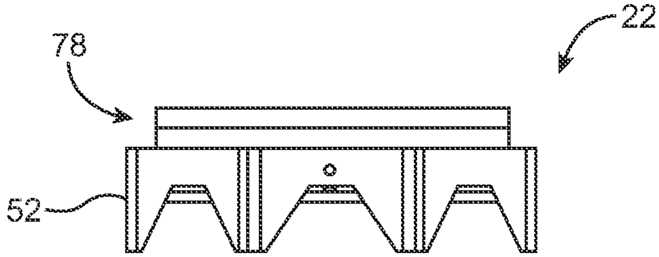
FIG. 17 presents a side view of the satellite of FIG. 16 with its antenna arrays in a stowed configuration, in accordance with some embodiments.
Figure 18:
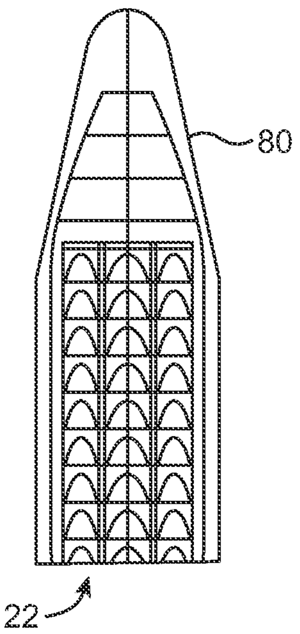
FIG. 18 presents a cross-sectional side view of a spacecraft payload fairing loaded with satellites of the type shown in FIGS. 16 and 17, in accordance with some embodiments.

FIG. 17 shows how the panels of antenna arrays 78 of FIG. 16 may be stowed. As shown in FIG. 17, the stowed panels of antenna arrays 78 may be thicker than the panel(s) of antenna arrays 78 of satellite 22 of FIG. 11. FIG. 18 shows how satellites such as satellite 22 of FIG. 18 may be loaded into payload fairing 80 in nested stacks. The fairing 80 of FIGS. 12, 15, and 18 can include only buses 52 having one type of antenna array (e.g., direct radiating array 30) in a homogeneous payload or can include buses 52 having multiple types of antenna arrays (e.g., with different height) in a heterogeneous payload.

Satellites 22 may be densely packed into fairing 80 by omitting central dispensing mechanisms. In space, each stacked satellite can be serially dispensed using (e.g., passive) dispensing mechanisms such as wireless electrically controllable release devices and passive separation springs. Satellites 22 may be dispensed by releasing the fairing surrounding the stacked satellites, releasing the uppermost stacked satellite (e.g., by releasing a junction between the uppermost and next-to-uppermost satellites in a stack via wireless commands from Earth), waiting for the released satellite to drift away from the stack, and repeating this process until all satellites have been released. The timing of each release can be further selected to facilitate positioning the satellite 22 into its orbit.

If desired, the same (or nearly the same) space fed array design may be used in satellites 22 of different configurations. For example, space fed array 40 of C-band-to-V-band satellite 22 of FIG. 2 may be of the same configuration as space fed array 40 of V-band satellite 22 of FIG. 3. Bus 52 may also be the same or similar when configured for use in satellites 22 of the type shown in FIG. 2 (sometimes referred to as hybrid satellites or retrofit antenna satellites) and when configured for use in satellites 22 of the type shown in FIG. 3. Using this approach, parts of satellites 22 such as a common space fed array and a common bus may be shared. When configured to operate in a V-band arrangement, the direct radiating array 30 that is mounted on space fed array 40 will be of similar size (and will handle the same satellite band) as inner array 42 in space fed array 40. When configured to operate in a hybrid mode, direct radiating array 30 may be larger than inner array 42 of space fed array 40 (e.g., array 30 may be relatively large to handle C-band signals whereas space feed array 40 may have antenna arrays that are more compact and suitable for handling V-band signals).

Satellites 22 with the equal-size-array configuration and satellites 22 with the hybrid array configuration may be mounted in a common payload fairing for delivery to space and/or may be deployed using separate payload fairings. When loaded into the same payload fairing, both types of satellites may be accommodated by adjusting the leg size of legs 56 of satellite buses 52. This allows array panel stacks of different heights to be accommodated in the nested stacks of satellites.

In accordance with an embodiment, a satellite is provided that includes a satellite bus, antenna arrays coupled to the satellite bus, the antenna arrays include a direct radiating array that handles signals in a first satellite band and a space fed array that handles signals in a second satellite band at higher frequencies than the first satellite band, and upconversion and downconversion circuitry coupled between the direct radiating array and the space fed array.

In accordance with another embodiment, the space fed array includes an inner array that is communicatively coupled to the direct radiating array by the upconversion and downconversion circuitry and includes a feed array.

In accordance with another embodiment, the satellite includes deployment actuators that separate the feed array from the inner array.

In accordance with another embodiment, the direct radiating array includes first antenna elements, the inner antenna array incldues second antenna elements, each of the first antenna elements is configured to receive wireless signals from Earth in the first satellite band and is configured to provide corresponding upconverted versions of these signals in the second satellite band to a respective one of the second antenna elements through a respective upconverter in the upconversion and downconversion circuitry, and each of the second antenna elements is configured to receive wireless signals from the feed array in the second satellite band and is configured to provide corresponding downconverted versions of these signals in the first satellite band to a respective one of the first antenna elements through a respective downconverter in the upconversion and downconversion circuitry.

In accordance with another embodiment, the first satellite band incldues a C-band and the wireless signals received from Earth inclued C-band signals.

In accordance with another embodiment, the second satellite band incldues a V-band and the wireless signals received from the feed array include V-band signals.

In accordance with another embodiment, the satellite includes beamforming and signal routing circuitry in the satellite bus that is coupled to the feed array.

In accordance with an embodiment, a satellite is provided that includes a satellite bus, and antenna arrays coupled to the satellite bus, the antenna arrays have a selected one of: a first configuration in which the antenna arrays include a space fed array having a feed array and an inner array that operate in a first satellite band and include a first direct radiating array that is coupled to the inner array by upconversion and downconversion circuitry and that operates in a second satellite band that is different than the first satellite band, and a second configuration in which the antenna arrays include the space fed array having the feed array and the inner array that operate the first satellite band and include a second direct radiating array that is coupled to the inner array and that is operates in the first satellite band.

In accordance with another embodiment, the satellite includes support structures that separate the inner array from the feed array.

In accordance with another embodiment, the satellite bus has a polygonal outline and has legs.

In accordance with another embodiment, the satellite bus has peripheral wall panels and has configurable-length corner fittings coupled to the peripheral wall panels that form the legs.

In accordance with another embodiment, the satellite includes solar panels coupled to the satellite bus.

In accordance with another embodiment, the first satellite band includes a satellite band selected from the group consisting of: a Ka-band, a V-band, and a W-band.

In accordance with another embodiment, the second satellite band includes a satellite band selected from the group consisting of: an L-band, an S-band, and a C-band.

In accordance with an embodiment, a plurality of satellites operable in a satellite system is provided that includes first satellites that each have a first satellite bus, a first space fed array having a first feed array and a first inner array that operate in a first satellite band, and a first direct radiating array that is coupled to the first inner array by upconversion and downconversion circuitry and that operates in a second satellite band that is different than the first satellite band, and second satellites that each have a second satellite bus, a second space fed array having a second feed array and a second inner array that operate in the first satellite band, and a second direct radiating array that is coupled to the second inner array and that operates in the first satellite band.

In accordance with another embodiment, the first and second satellites are stacked in a nested stack in a common payload fairing.

In accordance with another embodiment, at least one of the first satellites has legs of a different length than at least one of the second satellites.

In accordance with another embodiment, the first and second satellite buses include at least one satellite bus at a first location in the nested stack and at least another satellite bus at a second location in the nested stack, the second location is higher in the nested stack than the first location, the satellite bus at the first location has first legs, the satellite bus at the second location has second legs, and the first legs are configured to sustain a higher load than the second legs.

In accordance with another embodiment, the first satellite buses and the second satellite buses have a common outline.

In accordance with another embodiment, the common outline of the first and second satellite buses is polygonal and the first and second legs include respective first and second corner fittings coupled respectively to the first and second satellite buses, the first and second corner fittings differ with respect to at least a strength characteristic, a height characteristic, a shape characteristic, a size characteristic, or a composition characteristic.

The foregoing is merely illustrative and various modifications can be made to the described embodiments. The foregoing embodiments may be implemented individually or in any combination.

What is claimed is:

1. A method of operating a satellite system, the method comprising:

moving a first communications satellite into space from a payload fairing of a launch vehicle, wherein the first communications satellite includes a first satellite bus, a first antenna array, a first actuator coupled to a first end of the antenna array, and a second actuator coupled to a second end of the antenna array opposite the first end; and increasing, using the first actuator and the second actuator, a distance between the first satellite bus and the first antenna array after the first communications satellite has moved into space from the payload fairing of the launch vehicle.

2. The method of claim 1, further comprising:

moving a second communications satellite into space from the payload fairing after the first communications satellite has been moved into space from the payload fairing wherein, prior to moving the first communications satellite into space from the payload fairing, the first communications satellite is stacked on the second communications satellite in the payload fairing.

3. The method of claim 2, wherein at least some of the second communications satellite is nested between separating structures of the first communications satellite in the payload fairing prior to moving the first communications satellite and the second communications satellite into space from the payload fairing.

4. The method of claim 3, wherein the separating structures comprise legs coupled to the first satellite bus.

5. The method of claim 4, further comprising:

unfolding a solar panel from the first satellite bus after the first communications satellite has moved into space from the payload fairing of the launch vehicle.

6. The method of claim 2, wherein the second communications satellite includes a second satellite bus, a second antenna array, and a third actuator, the method further comprising:

increasing, using the third actuator, a distance between the second satellite bus and the second antenna array after the second communications satellite has moved into space from the payload fairing of the launch vehicle.

7. A method of operating a satellite system, the method comprising:

moving a first communications satellite into space from a payload fairing of a launch vehicle, wherein the first communications satellite includes a first satellite bus, a first antenna array, and a first actuator;

increasing, using the first actuator, a distance between the first satellite bus and the first antenna array after the first communications satellite has moved into space from the payload fairing of the launch vehicle; and relaying, using the first antenna array, wireless data between a gateway and a user equipment device after the distance between the first satellite bus and the first antenna array has been increased by the actuator.

8. The method of claim 7, further comprising:

unfolding a solar panel from the first satellite bus after the first communications satellite has moved into space from the payload fairing of the launch vehicle.

9. The method of claim 7, further comprising a second antenna array on the first satellite bus.

10. The method of claim 9, wherein the second antenna array is configured to wirelessly feed the first antenna array.

11. A stack of communications satellites mountable in a payload fairing of a launch vehicle, the stack of communications satellites comprising:

a first communications satellite; and a second communications satellite on the first communications satellite in the stack, wherein the second communications satellite includes separating structures that separate the second communications satellite from the first communications satellite in the payload fairing, and the first communications satellite includes a structure that is nested between the separating structures of the second communications satellite, wherein the structure comprises a phased antenna array or a solar panel.

12. The stack of communications satellites defined in claim 11, wherein the second communications satellite is configured to be dispensed into space from the payload fairing prior to the first communications satellite.

13. The stack of communications satellites defined in claim 11, wherein the structure comprises the solar panel and the solar panel is coupled to a satellite bus of the first communications satellite.

14. The stack of communications satellites defined in claim 11, wherein the structure comprises an phased antenna array and the phased antenna array is coupled to a satellite bus of the first communications satellite.

15. The stack of communications satellites defined in claim 11, wherein the separating structures comprise legs coupled to a satellite bus of the second communications satellite.

16. The stack of communications satellites defined in claim 11, wherein the separating structures comprise posts coupled to a satellite bus of the second communications satellite.

17. The stack of communications satellites defined in claim 11, wherein the structure is in a retracted configuration in the payload fairing and the first communications satellite comprises an actuator configured to increase a distance between the structure and a satellite bus of the first communications satellite after the first communications satellite has been dispensed into space from the payload fairing.

18. The stack of communications satellites defined in claim 11, wherein the separating structures of the second communications satellite laterally surround the structure of the second communications satellite.

19. A satellite system comprising:

a first communications satellite in a folded configuration; and a second communications satellite stacked on the first communications satellite, wherein the second communications satellite has separating structures that are positioned on top of the first of the communications satellite, and the first communications satellite is configured to transition to an unfolded configuration after being deployed in space.

20. The satellite system of claim 19, wherein the first communications satellite includes a structure positioned between the separating structures of the second communications satellite, the structure comprising a solar panel or an antenna array.

* * * * *